United States Patent
Fang et al.

(10) Patent No.: US 9,491,565 B2
(45) Date of Patent: Nov. 8, 2016

(54) FIXED LOCATION REGISTRATION

(71) Applicants: ZTE Corporation, Shenzhen (CN);
ZTE (USA) Inc., Morristown, NJ (US)

(72) Inventors: Yonggang Fang, San Diego, CA (US);
YuanFang Yu, Shenzhen (CN); Ting Lu, Beijing (CN); Xiaowu Zhao, Shenzhen (CN)

(73) Assignees: ZTE Corporation, Shenzhen (CN);
ZTE (USA) Inc., Austin, TX (US)

(*) Notice: Subject to any disclaimer, the term of this patent is extended or adjusted under 35 U.S.C. 154(b) by 0 days.

(21) Appl. No.: 13/763,544

(22) Filed: Feb. 8, 2013

(65) Prior Publication Data

US 2013/0210414 A1 Aug. 15, 2013

Related U.S. Application Data

(60) Provisional application No. 61/605,721, filed on Mar. 1, 2012.

(30) Foreign Application Priority Data

Feb. 9, 2012 (CN) .................. PCT/CN2012/070989

(51) Int. Cl.
*H04M 3/00* (2006.01)
*H04W 4/00* (2009.01)

(52) U.S. Cl.
CPC .................................. *H04W 4/005* (2013.01)

(58) Field of Classification Search
CPC . H04W 4/005; H04W 28/12; H04W 76/046; H04W 24/02; H04L 67/104; H04M 15/00; H04B 7/2609; H04B 7/2612; H04B 1/3822; H04B 7/024; H04B 7/0456; H04B 7/0486; H04B 7/0632; H04B 7/0639
USPC ......................................................... 455/418
See application file for complete search history.

(56) References Cited

U.S. PATENT DOCUMENTS

| | | |
|---|---|---|
| 2005/0090269 A1 | 4/2005 | Kim et al. |
| 2011/0201354 A1* | 8/2011 | Park et al. .................. 455/456.1 |
| 2011/0238844 A1 | 9/2011 | Lu et al. |
| 2012/0058764 A1* | 3/2012 | Kang et al. ................. 455/435.1 |
| 2012/0149383 A1* | 6/2012 | Wang et al. .................. 455/450 |
| 2013/0046841 A1* | 2/2013 | Park et al. ..................... 709/206 |
| 2013/0322360 A1* | 12/2013 | Fan et al. ...................... 370/329 |

OTHER PUBLICATIONS

Office Action dated Dec. 21, 2015 for Chinese Patent Application No. 201310049252.9, filed on Feb. 7, 2013 (5 pages).
Intel, "MTC Low Mobility — Optimizing periodic LU/RAU/TAU signalling," 3GPP TSG Sa WG2 Meeting #78, TD 52-101420, San Francisco, USA, 3 pages, Feb. 2010.
Office Action dated Aug. 22, 2016 for Chinese Patent Application No. 201310049252.9, filed on Feb. 7, 2013 (8 pages).

* cited by examiner

*Primary Examiner* — Kwasi Karikari
(74) *Attorney, Agent, or Firm* — Perkins Coie LLP

(57) ABSTRACT

Systems, devices and techniques for machine to machine (M2M) communications include optimizing performance of an M2M network based on knowledge about a fixed, or non-mobile, operation of an M2M service. In various embodiments, paging operation, direct channel assignment operation and timer based registration are optimized. The fixed operation may be communicated by a user device receiving the service to a network server providing the service.

18 Claims, 4 Drawing Sheets

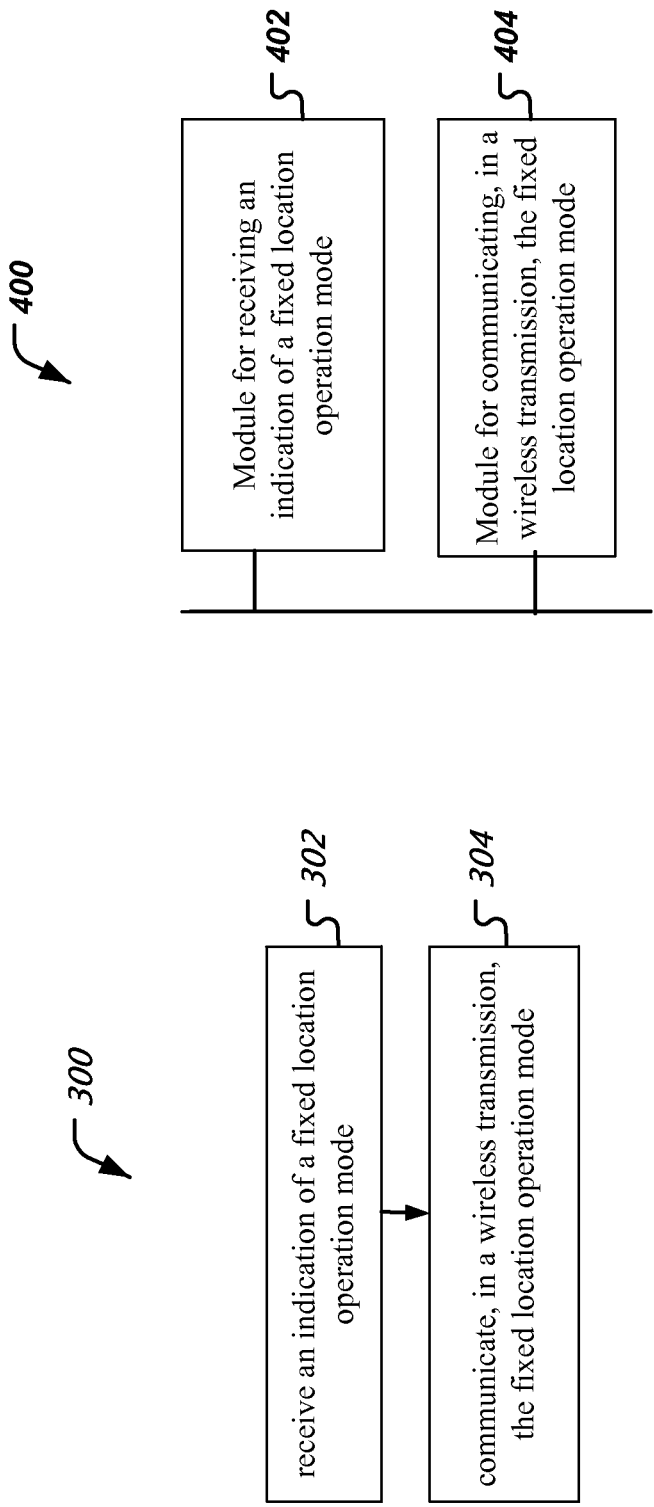

FIXED LOCATION REGISTRATION

CROSS REFERENCE TO RELATED APPLICATIONS

This document claims the right of priority under 35 U.S.C. §119(a) and the Paris Convention of International Patent Application No. PCT/CN2012/070989, filed on Feb. 9, 2012. This document also claims benefit of priority of U.S. Provisional Patent Application No. 61/605,721, filed on Mar. 1, 2012. The entire contents of the before-mentioned patent applications are incorporated by reference herein.

TECHNICAL FIELD

This patent document relates to systems, devices and techniques for machine to machine (M2M) communication in a wireless communications system.

BACKGROUND

Some Machine-to-Machine services may be installed at a location permanently. Some examples include M2M smart meters, environment monitoring devices, etc.

Techniques are needed for improved M2M communications in which M2M services may be at a fixed location.

SUMMARY

This patent document provides, among others, systems, devices and techniques that are useful, in one aspect, for improving performance of a network when supporting M2M communications for fixed services.

In one aspect, systems, devices and techniques for machine to machine (M2M) communications include optimizing performance of an M2M network based on knowledge about fixed, or non-mobile, operation of an M2M service. In various embodiments, paging operation, direct channel assignment operation and timer based registration are optimized.

This and other aspects and their implementations are described in greater detail in the drawings, the description and the claims.

BRIEF DESCRIPTION OF DRAWINGS

FIG. 3 is a flowchart representation of a process for facilitating M2M wireless communications.

FIG. 4 is a block diagram representation of a M2M communication apparatus.

DETAILED DESCRIPTION

Figure 1:
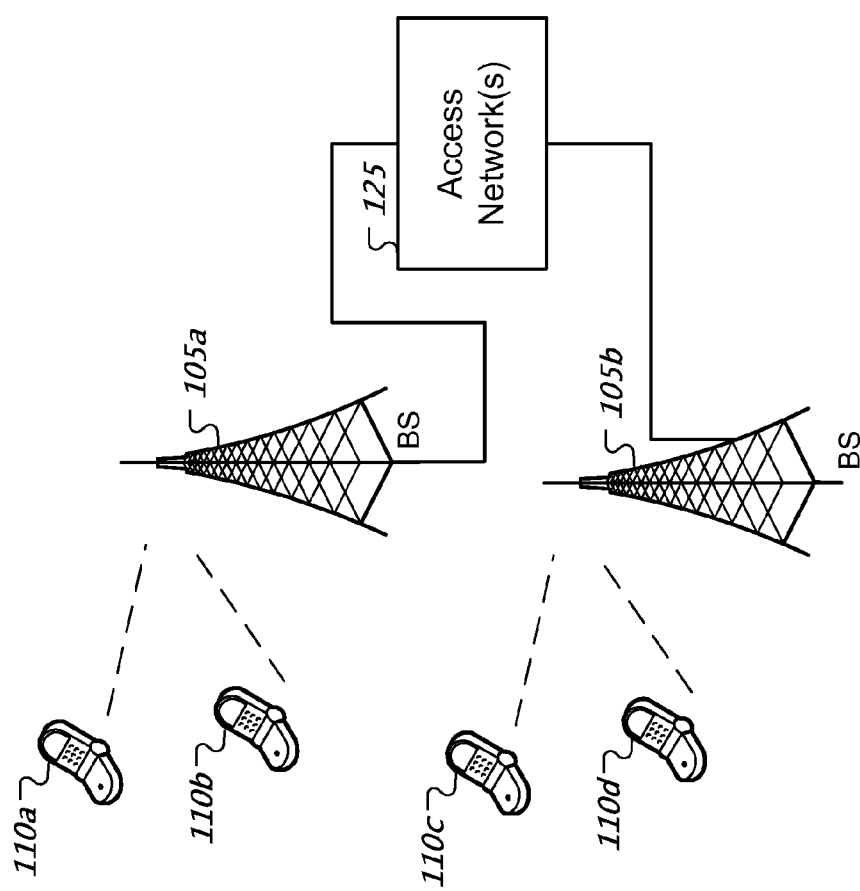
FIG. 1 is a block diagram representation of a wireless communications network.

This patent document discloses techniques for utilizing information about fixed location services in improving performance of M2M communication.

Machine-to-Machine (M2M) communication is a form of data communication that involves one or more entities that do not require explicit human interaction or intervention in the process of communication.

M2M communication could be carried over cdma2000 1× or HRPD (high rate packet data) networks. In M2M communication, cdma2000 role is largely confined to serve as a transport network.

M2M services may have their own specific characteristics which might be different from services in which humans directly influence communication flow. This may require some special handling or optimization on cdma2000 network for better support of M2M communications.

The Third Generation Partnership Project 2 (3GPP2) consortium has specified certain requirements and architectural blocks of M2M communications in wireless network. The techniques disclosed in this patent document may be useful in improving performance of a conventional 3GPP2 system. For example, the TSG-A working group of 3GPP2 has presently defined M2M architecture and certain messages and functionality to support M2M communications.

The terms "wireless device" and "mobile device" are often used interchangeably. However, there can be several operational differences between the operation of a wireless device that is not moving (sometimes called fixed wireless) and a mobile device (that is also wirelessly communicating). For example, the channel conditions may change rapidly when a device is mobile. In addition, the communication to/from a mobile device may suffer from channel degradations due to Doppler frequency shift.

The various wireless communication networks that are discussed in this document (e.g., cdma200 1× or HRPD), provide for techniques that are able to take into account mobility of user equipment. These techniques include the use of long preambles, frequent reference signal transmissions for link quality maintenance, mobility management, signaling and procedures for soft or handoff between different radio access networks, etc.

In contrast to the typical mobile user devices such as phones, smartphones, tablet computers, peripheral plug-in cards, etc., M2M devices may not be moved once they are put into operations. In addition, power utilization of M2M devices may be of utmost concern because unlike mobile devices that can be charged after some time interval (e.g., every night), some M2M devices may be inaccessible or impractical for battery charging or battery replacement (e.g., M2M devices deployed in hazardous conditions, on tall towers, underwater in swimming pools, etc.).

While deployment of M2M devices benefits from the available infrastructure of presently deployed wireless systems, the present systems fail to exploit knowledge regarding fixed location operation of a wireless device to provide operational efficiency such as lower communication overhead and better power management, among others. The present document provides techniques that address these technical problems, among others. As further described in greater detail, in one aspect, a message is provided for communicating a fixed location operation of a wireless device. Based on the knowledge about the fixed location operation, operation of the M2M device can be optimized.

FIG. 1 shows an example of a wireless communication system. A wireless communication system can include one or more base stations (BSs) 105*a*, 105*b*, one or more wireless devices 110*a*, 110*b*, 110*c*, 110*d*, and an access network 125. A base station 105*a*, 105*b* can provide wireless service to wireless devices 110*a*, 110*b*, 110*c* and 110*d* in one or more wireless sectors. In some implementations, a base station 105*a*, 105*b* includes directional antennas to produce two or more directional beams to provide wireless coverage in different sectors.

The access network 125 can communicate with one or more base stations 105*a*, 105*b*. In some implementations, the access network 125 includes one or more base stations 105*a*, 105*b*. In some implementations, the access network 125 is in communication with a core network (not shown in FIG. 1) that provides connectivity with other wireless communication systems and wired communication systems. The core network may include one or more service subscription databases to store information related to the subscribed wireless devices 110*a*, 110*b*, 110*c* and 110*d*. A first base station 105*a* can provide wireless service based on a first radio access technology, whereas a second base station 105*b* can provide wireless service based on a second radio access technology. The base stations 105*a* and 105*b* may be co-located or may be separately installed in the field according to the deployment scenario. The access network 125 can support multiple different radio access technologies.

Various examples of wireless communication systems and access networks that can implement the present techniques and systems include, among others, wireless communication systems based Code division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE), and Worldwide Interoperability for Microwave Access (WiMAX). In some implementations, a wireless communication system can include multiple networks using different wireless technologies. A dual-mode or multi-mode wireless device includes two or more wireless technologies that could be used to connect to different wireless networks. In some implementations, a wireless device can support Simultaneous Voice-Data Operation (SV-DO).

Figure 2:
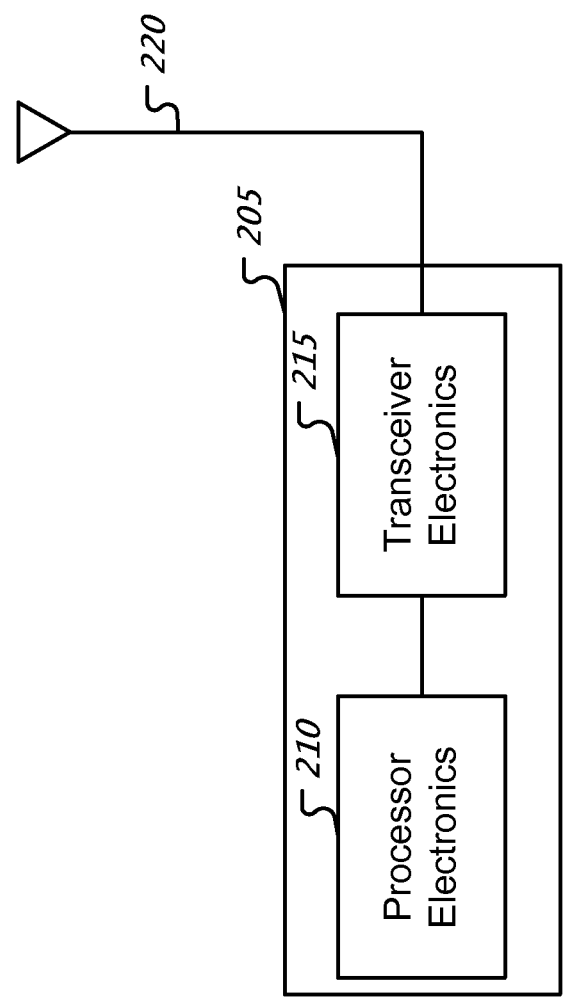
FIG. 2 is a block diagram representation of a wireless communications device.
Figure 6:
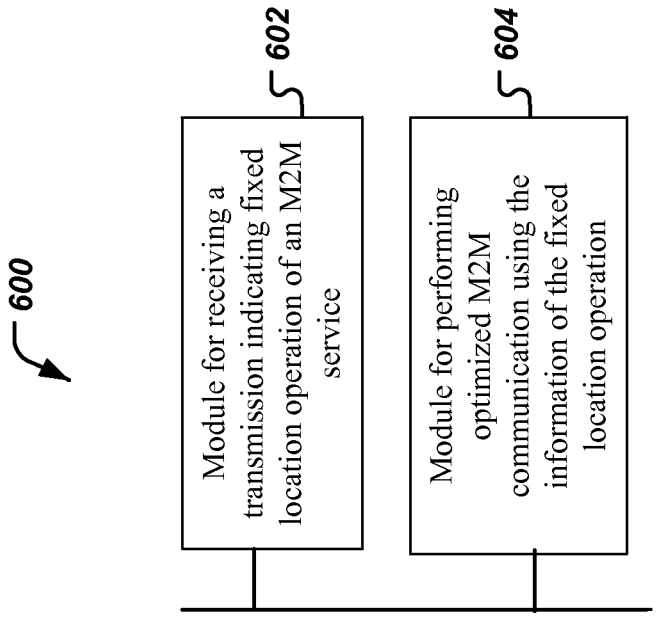
FIG. 6 is a block diagram representation of a M2M communication apparatus.

FIG. 2 is a block diagram representation of a portion of a radio station 205. A radio station 205 such as a base station or a wireless device (e.g., user equipment UE) can include processor electronics 210 such as a microprocessor that implements one or more of the wireless techniques presented in this document. The radio station 205 can include transceiver electronics 215 to send and/or receive wireless signals over one or more communication interfaces such as antenna 220. The radio station 205 can include other communication interfaces for transmitting and receiving data. Radio station 205 can include one or more memories configured to store information such as data and/or instructions. In some implementations, the processor electronics 210 can include at least a portion of the transceiver electronics 215. It will be appreciated that the disclosed techniques may be implemented to execute on the radio station 205.

In M2M networks, the radio station 205 may be incorporated in equipment that does not necessarily require human interaction. Some non-limiting examples include smart meters such as gas or electricity meters, sensors such as weather stations, surveillance cameras, etc.

As previously discussed, some M2M services may be installed at a location permanently. In some embodiments, an M2M service refers to an application running on a device (called M2M device) that performs M2M communication with a wireless network. For example, M2M smart meters, environment monitoring devices, etc. In such cases of fixed M2M service locations, it may be possible to use the information about non-mobility to optimize resource usage. Resources may for example be battery life of devices, network bandwidth and so on. For example, a network-side bandwidth resource allocator may reduce or eliminate certain type of reference signal transmissions to the device that is in a fixed location operations. In some cases, signal parameters such as preamble length may be minimized due to absence of Doppler shift distortion. Furthermore, implementation complexity can be reduced at the device side or the network side by eliminating the need to implement handover related calculations such as measuring signal quality of other base stations in the area, etc.

In some embodiments, a non-mobility registration message may be utilized. In some embodiments, when an M2M device is installed at a fixed location, the M2M device sends a non-mobility message to notify the network about non-mobility information and the current location information for the M2M device. In some embodiments, the location information is global positioning satellite (GPS) information. In some embodiments, the location information is input into the M2M device by a user using a computer connected to the M2M device during installation or using a front panel interface.

In some embodiments, the existing Generic Extension Message (GEN) defined by 3GPP2 may is modified by adding a non-mobility indication field. When a M2M device is installed a fixed location, it sends a GEN message with non-mobility indication to notify the network of its non-mobility information.

In some embodiments, the non-mobility indication may be added to the Registration, Origination and/or Page Response Message. When a M2M device is installed a fixed location, it sends those messages with non-mobility indication to notify the network its non-mobility information.

It will be appreciated that the techniques disclosed in this document may also be useful for devices that are "long term" fixed. For example, these devices may be fixed (or non-mobile) during operation, but may from time to time be taken offline and brought back online at a different location.

In some embodiments, paging operation in an M2M network can be optimized as follows. When the network knows the device with non-mobility, the network can page the device in the fixed location which is indicated by the device's registration message. If the network does not receive the page response message, it can re-send the page message assuming that the device is in the same location, instead of increasing the paging area for the mobile devices in the existing hierarchal paging mechanism. In one aspect, this will reduce the paging channel congestion and improve the network performance.

In some embodiments, the assignment of Direct Channel may be optimized as follows. When the network knows the device with non-mobility, the network can send the direct channel assignment message to the device only through the base station that the device registers through. In the legacy system, in order to achieve high successful rate of direct channel assignment, the network needs to send this message in a couple of base stations. Since the direct channel assignment message has a large size of content, it reduces the network's Forward Link (FL) capacity when largely using this mechanism. In addition, the direct channel assignment mechanism will cause the FL transmission from the multiple base stations, it will increase the FL interference. With this optimization, the network may only send the direct channel assignment message over the base station which the non-mobility device registers, and only enable the FL transmission over that base station.

In some embodiments, timer base registration process may be optimized as follows. The non-mobility device may disable the timer based registration and not periodically send the timer-based registration messages to the network. In one aspect, this helps reduce the battery consumption of the device and improve the network capacity. When the network knows the device with non-mobility, the mobile switching center (MSC) may disable the de-active timer for the device. Therefore, the MSC may not clean up the record of the device when it does not receive a registration message from the device for a while. If the device encounters some problem such as stolen, failure, and the network cannot reach the device through paging or direct channel assignment message, the MSC can clean up the record of this device. If the device fails to originate a call, the device starts a new registration procedure.

FIG. 3 is a flowchart representation of a method 300 of facilitating machine to machine (M2M) wireless communications implemented at a wireless device. The method 300 can be implemented in the M2M wireless device.

At 302, an indication of a fixed location operation mode is received. As previously disclosed, the indication may be provided by a user, e.g., operating a user interface (e.g., touchscreen display or control buttons) of the wireless device.

At 304, based on the received indication, the wireless device may communicate, in a wireless transmission the fixed location operation mode to the network. As previously disclosed, the communication may use a registration message, a generic extension message and a paging response message, etc.

FIG. 4 is a block diagram representation of an apparatus 400 for M2M communications. The module 402 (e.g., a receiver) is for receiving an indication of a fixed location operation mode, e.g., from a user. The module 404 (e.g., a communicator) is for communicating that communicates, in a wireless transmission, the fixed location operation mode. The apparatus 400 and modules 402, 404 may further be configured to implement techniques disclosed in this document.

Figure 5:
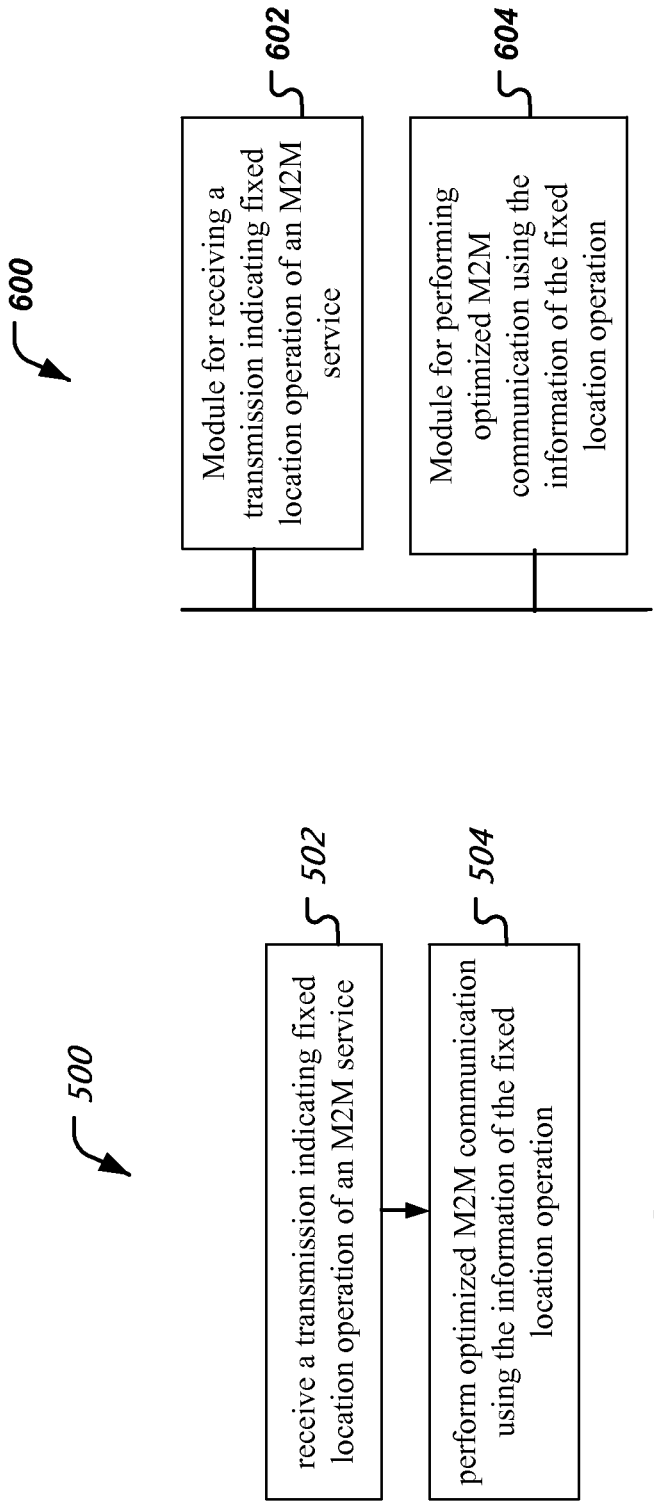
FIG. 5 is a flowchart representation of a process for facilitating M2M wireless communications.

FIG. 5 is a flowchart representation of a method 500 of facilitating machine to machine (M2M) wireless communications implemented in a wireless communication network.

At 502, a transmission indicating fixed location operation of an M2M service is received at an apparatus in the network (e.g., a base station).

At 504, optimized M2M communication is performed using the information of the fixed location operation. The optimization may include one of the several techniques disclosed in the present document.

In some implementations, a wireless communication system includes a machine to machine (M2M) device that is configured to indicate a fixed location operation mode and a network server that is configured to receive the indication of the fixed location operation mode and optimize communication with the machine to machine device based on the indication.

It will be appreciated that techniques are describe for facilitating the operation of M2M networks when M2M services are known to be at a fixed location.

It will also further be appreciated that methods and apparatus for facilitating machine to machine (M2M) wireless communications implemented at a wireless device, comprising receiving an indication of a fixed operation mode; and communicating, in a wireless transmission, the fixed operation mode is disclosed.

It will further be appreciated that methods and apparatus of facilitating machine to machine (M2M) wireless communications implemented in a wireless communication network, comprising receiving a transmission indicating fixed operation of an M2M service; and performing optimized M2M communication using the information of the fixed operation are disclosed.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of facilitating machine to machine (M2M) wireless communications implemented at a wireless device, comprising:
   receiving an indication of a fixed location operation mode from a user interface of the wireless device;
   communicating, in a wireless transmission, the fixed location operation mode;
   disabling timer-based registration, thereby refraining from performing periodic transmissions of registration messages; and
   starting a new registration process when the wireless device fails to originate a call after refraining from performing periodic transmissions of registration messages.

2. The method recited in claim 1, wherein the wireless transmission comprises one of a registration message, a generic extension message and a paging response message.

3. The method recited in claim 1, further comprising:
   receiving a direct channel assignment message only through a base station that was previously used by the wireless device for communicating the fixed location operation mode.

4. The method recited in claim 1, wherein the indication comprising a location of the device, and the location of the device is provided by a user during installation.

5. A machine to machine (M2M) wireless communications apparatus, comprising:
   a receiver that receives an indication of a fixed location operation mode from a user interface of the apparatus;
   a communicator that communicates, in a wireless transmission, the fixed location operation mode;
   a timer module that disables timer-based registration in response to the receiver receiving the indication of fixed location operation mode, thereby refraining the apparatus from performing periodic transmissions of registration messages, and the timer module becomes inactive after disabling the timer-based registration;
   a processor; and
   one or more memories configured to store instructions, when executed by the processor, causing the processor to start a new registration process when the apparatus fails to originate a call after refraining from performing periodic transmissions of registration messages.

6. The apparatus of claim 5, wherein the wireless transmission comprises one of a registration message, a generic extension message and a paging response message.

7. The apparatus of claim 5, further comprising:
   a paging module that receives a re-paging message, when no response was provided to an earlier paging message, wherein the re-paging message was transmitted without increasing paging area.

8. The apparatus of claim 5, wherein the receiver receives the indication comprising a location of the receiver, and wherein the location of the receiver is provided by a user during installation of the apparatus.

9. A wireless communications system comprising:
   a machine to machine (M2M) device that is configured from a user interface of the M2M device to indicate a fixed location operation mode, and to disable timer-based registration in response to receiving the indication of fixed location operation mode, thereby refraining the device from performing periodic transmissions of registration messages and starting a new registration process when the device fails to originate a call after refraining from performing periodic transmissions of registration messages; and
   a network server that is configured to receive the indication of the fixed location operation mode, optimize communication with the M2M device based on the indication, and refrain from cleaning up a record of the M2M device even when no periodic registration message is received from the M2M device.

10. A method of facilitating machine to machine (M2M) wireless communications implemented in a wireless communication network, comprising:
    receiving a transmission from an M2M device that is configured from a user interface of the M2M device to indicate a fixed location operation mode of an M2M service;
    performing optimized M2M communication using the information of the fixed location operation; and
    refraining from cleaning up a record of the M2M device even when no periodic registration message is received from the M2M device.

11. The method recited in claim 10, wherein the optimized M2M communication comprises performing paging retries without increasing paging area.

12. The method recited in claim 10, wherein the optimized M2M communication comprises performing direct channel assignment only through a base station via which the transmission was received.

13. A server apparatus in a wireless communication network, comprising:

a receiver that receives a transmission from a machine to machine (M2M) device that is configured from a user interface of the M2M device to indicate a fixed location operation mode of an M2M service; and a processor that performs optimized M2M communication using the information of the fixed operation comprising refraining from cleaning up a record of the M2M device even when no periodic registration message is received from the M2M device.

14. The apparatus recited in claim 13, wherein the optimized M2M communication comprises performing paging retries without increasing paging area.

15. The apparatus recited in claim 13, wherein the optimized M2M communication comprises performing direct channel assignment only through a base station via which the transmission was received.

16. A wireless communication apparatus comprising:
a memory that stores instructions; and
a processor that reads the instructions from the memory and implements a method of facilitating machine to machine (M2M) wireless communications implemented in a wireless communication network, the method comprising:

receiving a transmission from an M2M device that is configured from a user interface of the M2M device to indicate a fixed location operation mode of an M2M service;

performing optimized M2M communication using the information of the fixed location operation; and refraining from cleaning up a record of the M2M device even when no periodic registration message is received from the M2M device.

17. The apparatus recited in claim 16, wherein the optimized M2M communication comprises performing paging retries without increasing paging area.

18. The apparatus recited in claim 16, wherein the optimized M2M communication comprises performing direct channel assignment only through a base station via which the transmission was received.

* * * * *